US011984111B2

(12) United States Patent
Noguchi

(10) Patent No.: US 11,984,111 B2
(45) Date of Patent: May 14, 2024

(54) VEHICLES

(71) Applicant: HONDA MOTOR CO., LTD., Tokyo (JP)

(72) Inventor: Kohei Noguchi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 574 days.

(21) Appl. No.: 17/192,153

(22) Filed: Mar. 4, 2021

(65) Prior Publication Data

US 2021/0304729 A1 Sep. 30, 2021

(30) Foreign Application Priority Data

Mar. 31, 2020 (JP) ................................ 2020-061880

(51) Int. Cl.
*G10K 11/34* (2006.01)
*G10K 11/178* (2006.01)

(52) U.S. Cl.
CPC ............ *G10K 11/34* (2013.01); *G10K 11/178* (2013.01)

(58) Field of Classification Search
None
See application file for complete search history.

(56) References Cited

U.S. PATENT DOCUMENTS

2016/0157041 A1 6/2016 Shiozawa et al.
2016/0345115 A1* 11/2016 Paik ........................ H04S 7/303
2019/0141465 A1* 5/2019 Kim ......................... H04R 3/00

FOREIGN PATENT DOCUMENTS

EP 4049877 A1 * 8/2022 ............. B60K 35/00
JP 2007-116393 A 5/2007
JP 2010-058743 A 3/2010
JP 4590679 B2 12/2010
JP 5664603 2/2015
JP 2015-232849 A 12/2015
JP 2016-020210 2/2016

OTHER PUBLICATIONS

Japanese Office Action with English translation dated Oct. 26, 2021, 9 pages.
Indian Office Action dated Feb. 10, 2022, 5 pages.

* cited by examiner

*Primary Examiner* — Kenny H Truong
(74) *Attorney, Agent, or Firm* — Rankin, Hill & Clark LLP

(57) ABSTRACT

A vehicle includes options including function selection buttons and selection buttons respectively associated with operations of a plurality of functions mounted on the vehicle, and a sound controller is capable of changing a sound output from a speaker array to a sound that arrives from a target virtual sound source set at a predetermined position, and changes the position of the target virtual sound source for each of the options.

16 Claims, 16 Drawing Sheets

VEHICLES

INCORPORATION BY REFERENCE

The present application claims priority under 35 U.S.C. § 119 to Japanese Patent Application No. 2020-061880 filed on Mar. 31, 2020. The content of the application is incorporated herein by reference in its entirety.

BACKGROUND

Technical Field

The present invention relates to vehicles.

Related Art

A configuration is known in which a vehicle such as a motorcycle includes a display unit for displaying a menu screen, so that a user (an occupant such as a driver) can select a plurality of options on the menu screen by using various operation elements (also referred to as an interface) such as a touch panel (for example, JP 2016-020210 A).

In addition, as a technique for transmitting information to the occupant in a method other than a display, a technique has been proposed in which a head transfer function indicating a transfer function of a sound from a virtual sound source to an eardrum of a listener is used to orient a sound image formed by an R speaker and an L speaker to a gazing point, and to guide a driver's viewpoint in an appropriate direction in driving a vehicle or in a direction that should be visually recognized in the future (for example, JP 5664603 B2).

SUMMARY

As the vehicle becomes multifunctional, by the way, the number of options to be displayed on the menu screen increases, and the menu also tends to be hierarchically structured. This may make it difficult for a passenger to operate and select a desired option. Besides, since it is necessary to gaze at the display unit, it may be difficult to operate the display unit while driving the vehicle. On the other hand, in the technique disclosed in JP 5664603 B2, although information can be transmitted to the occupant in the method other than the display, the technique is for transmitting information for guiding the driver's line of sight. Hence, the operation on the menu screen is not made easier.

Therefore, an object of the present invention is to facilitate recognition of options without relying on the display, and to facilitate improvements of the operation performance.

In order to achieve the above object, a vehicle includes: a plurality of speakers (31); a sound controller (58C) configured to control a sound output from each of the plurality of speakers (31); and a plurality of options (BG, BG1, BG2) respectively associated with operations of a plurality of functions installed in the vehicle, wherein the sound controller (58C) is capable of changing the sound output from each of the plurality of speakers (31) to a sound that arrives from a virtual sound source (PT) set at a predetermined position, and changes a position of the virtual sound source (PT) for each of the plurality of options (BG, BG1, BG2).

In the above configuration, the vehicle may further include a display unit (27) configured to display the plurality of options (BG, BG1, BG2), wherein the sound controller (58C) changes the position of the virtual sound source (PT), based on a position of an option (BG, BG1, BG2) that has been displayed or selected. Further, in the above configuration, the plurality of options (BG, BG1, BG2) may have a hierarchical structure, and the sound controller (58C) may change the position of the virtual sound source (PT) in a first direction in which the plurality of options (BG, BG1, BG2) are arranged, based on the positions of the plurality of options (BG, BG1, BG2) in an identical layer.

Further, in the above configuration, the sound controller (58C) may change the position of the virtual sound source (PT) to a different position on a predetermined virtual line (LK), the predetermined virtual line (LK) being along the first direction in which the plurality of options (BG, BG1, BG2) are arranged and changing in a front-rear direction of the vehicle, based on the positions of the plurality of the options (BG, BG1, BG2) in the identical layer. In this case, the virtual line (LK) may a line being along a width direction of the vehicle and projecting on a front side of the vehicle.

Further, in the above configuration, the sound controller (58C) may change the position of the virtual sound source (PT) in a second direction that is different from the first direction, based on the positions of the plurality of options (BG1, BG2) in a different layer.

Further, in the above configuration, the sound controller (58C) may set the position of the virtual sound source (PT) corresponding to each of the plurality of options (BG, BG1, BG2), based on the number of the plurality of options (BG, BG1, BG2) in the identical layer.

Further, in the above configuration, the sound controller (58C) may output a sound indicating a title of one of the plurality of options (BG, BG1, BG2), as the sound that arrives from the virtual sound source (PT). In this case, the sound controller (58C) may output, as the sound that arrives from the virtual sound source (PT), a predetermined notification sound shorter than the sound indicating the title in a predetermined operation state in which the plurality of options (BG, BG1, BG2) are repeatedly selected, and may output the sound indicating the title in a state other than the predetermined operation state.

Further, in the above configuration, the sound controller (58C) may have a function of changing a sound corresponding to an indicator indicating a state to the sound that arrives from the virtual sound source set at a position corresponding to a degree of the state, and performing an indicator notification process for outputting the sound from one of the plurality of speakers.

Further, in the above configuration, the indicator indicating the state may include an inter-vehicle distance indicator configured to indicate an inter-vehicle distance set by adaptive cruise control, and the sound controller (58C) may change the position of the virtual sound source in a front-rear direction of the vehicle, based on the inter-vehicle distance. In this case, the sound controller may change a tone of the sound corresponding to the indicator indicating the state, depending on the degree of the state.

According to the present invention, the recognition of options is facilitated without relying on the display, and improvements of the operation performance are facilitated.

DETAILED DESCRIPTION

Hereinafter, embodiments of the present invention will be described with reference to the drawings. In the following description, directions such as front, back, left, right, up, and down are the same as the directions with respect to a vehicle body, unless otherwise stated. In addition, in each of the drawings, a symbol FR denotes a front side of the vehicle body, a symbol UP denotes an upper side of the vehicle body, and a symbol LH denotes a left side of the vehicle body.

Figure 1:
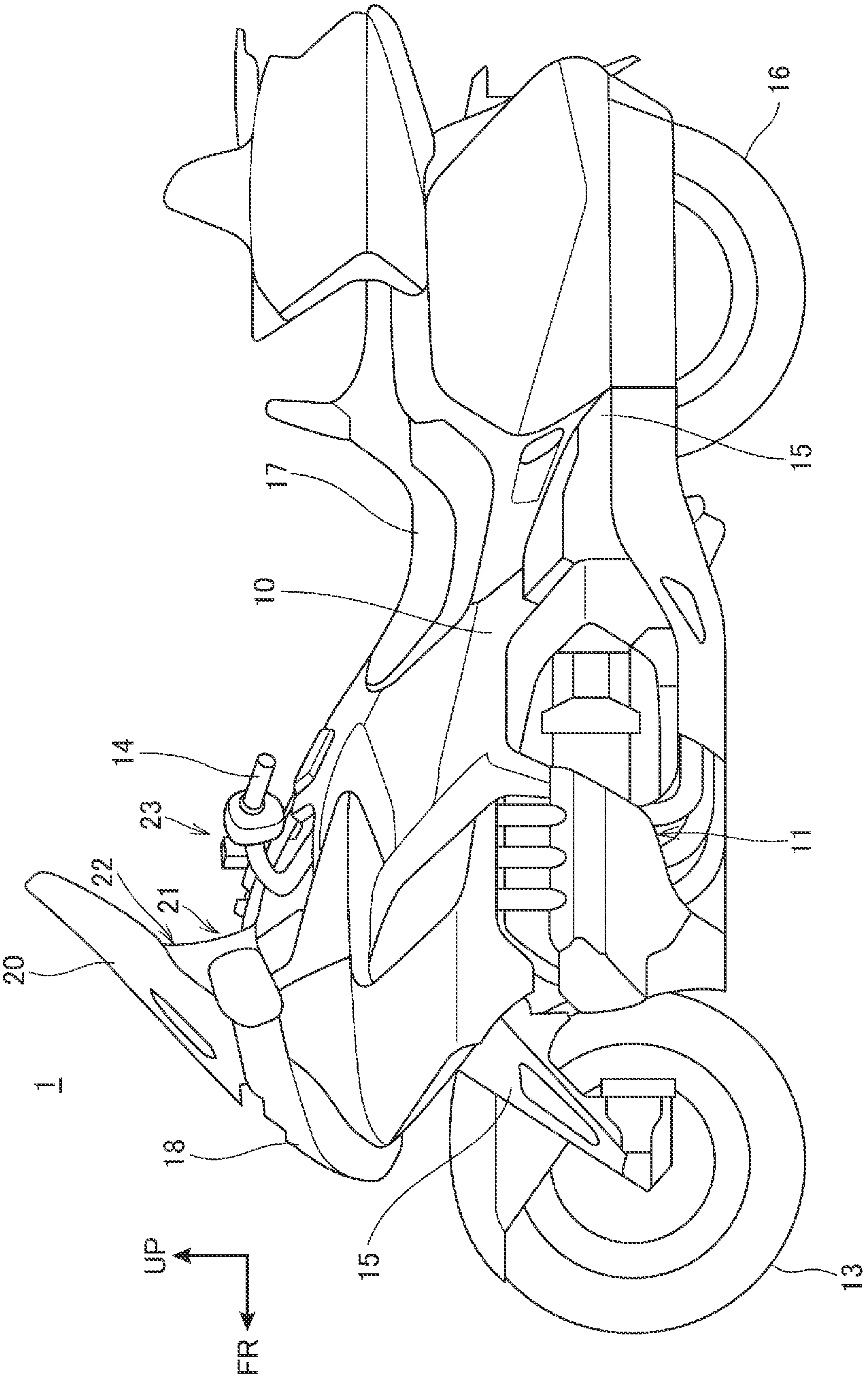
FIG. 1 is a side view of a motorcycle according to an embodiment of a vehicle of the present invention.
Figure 2:
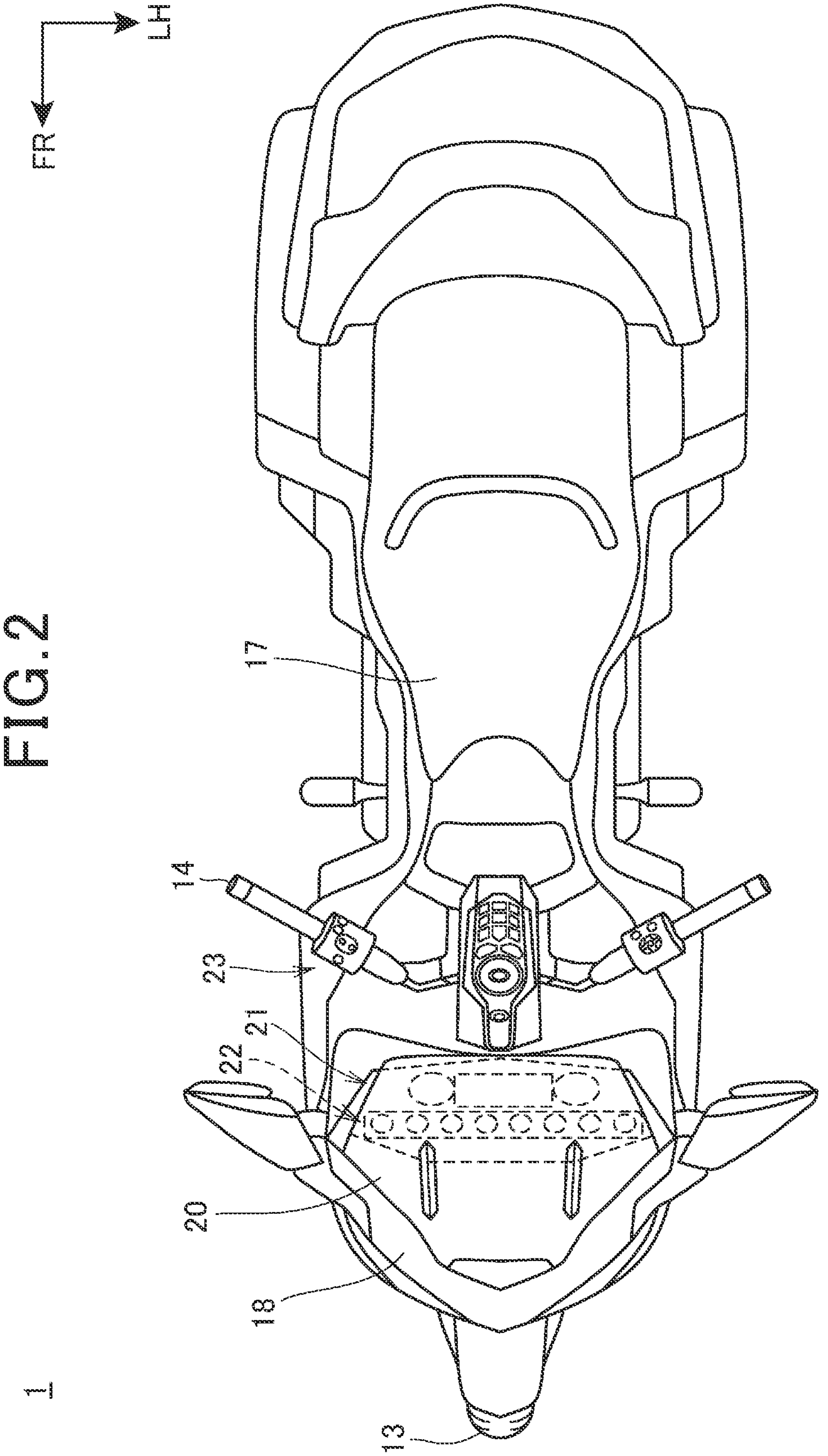
FIG. 2 is a top view of the motorcycle.

FIG. 1 is a side view of a motorcycle according to an embodiment of a vehicle in the present invention. FIG. 2 is a top view of the motorcycle. As shown in FIG. 1, a vehicle 1 constituted by such a motorcycle includes a vehicle body frame 10 and a power unit 11 supported by the vehicle body frame 10. At a front part of the vehicle body frame 10, a front wheel 13 is supported through a front fork 12, which also serves as a front cushion, so as to freely steer to the left and right. A steering handle 14 is provided at an upper part of the front fork 12. At a rear lower part of the vehicle body frame 10, a rear wheel 16 is supported through a swing arm 15 so as to freely swing up and down. A rear cushion is interposed between the vehicle body frame 10 and the swing arm 15. The power unit 11 includes an engine and a transmission mechanism, and drives the rear wheel 16 for rotation via a shaft drive mechanism.

As shown in FIG. 2, the vehicle body frame 10 supports, on the rear side of the steering handle 14, a seat 17 on which occupants of a driver and a passenger are seated, and also supports a vehicle body cover 18 for covering the substantially entire vehicle body frame 10. A front screen 20 or the like for covering the front side of the occupants is mounted on the vehicle body cover 18. A meter panel 21 for displaying various types of information and a speaker array 22, which functions as a speaker unit, are arranged between the front screen 20 and the steering handle 14. An operation unit 23 (a touch panel, switches) for selecting a menu or the like on the meter panel 21 is arranged around the steering handle 14.

On such a vehicle 1, an on-vehicle device 51 (FIG. 3 and the like, to be described later) electrically connected with the meter panel 21, the speaker array 22, and the operation unit 23 is mounted. The on-vehicle device 51 controls display contents of the meter panel 21 and output sounds of the speaker array 22, and also inputs various instructions from the driver (hereinafter, referred to as a "rider" as appropriate) via the operation unit 23.

Figure 3:
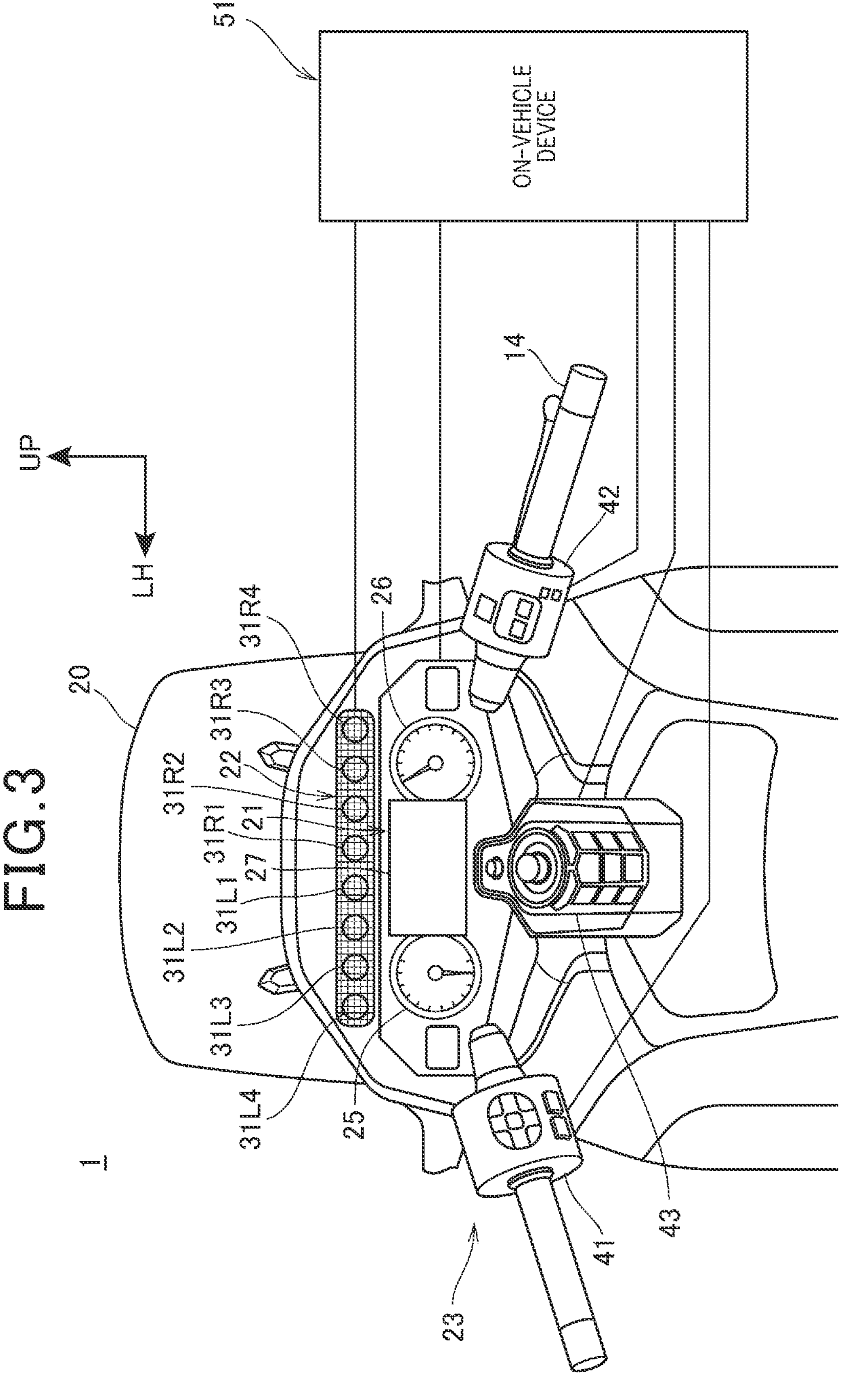
FIG. 3 is a view showing the periphery of a meter panel when viewed from a rider, together with an on-vehicle device.

FIG. 3 is a view showing the periphery of the meter panel 21 when viewed from the rider, together with the on-vehicle device 51. The meter panel 21 includes instruments 25 and 26 for displaying information related to the vehicle 1 (the speed, the engine speed, and the like), and a display unit 27 for displaying various types of information. The display unit 27 includes a known display panel such as a liquid crystal panel, and displays various types of information for the rider or the like under the control of the on-vehicle device 51. It is to be noted that a touch panel that constitutes a part of the operation unit 23 is superimposed on the display panel of the display unit 27.

The speaker array 22 includes a plurality of speakers (which are indicated by reference numerals 31L1 to 31L4 and 31R1 to 31R4 in FIG. 3) arranged in a width direction of the vehicle 1. The speaker array 22 is a speaker unit that enlarges an area where the rider or the like can hear in the width direction, and is also referred to as a line array speaker. The speaker array 22 is disposed above the meter panel 21. According to such an arrangement, the speaker array 22 can be arranged at a position closer to the ears of the rider. In addition, it becomes easy to avoid the situation in which the sound from the speaker array 22 is attenuated by the influence of the steering handle 14 or the like.

In the present configuration, four speakers 31L1 to 31L4 are arranged on the left side, and four speakers 31R1 to 31R4 are arranged on the right side, with the center position in a vehicle width direction as a reference (corresponding to the center position on the front side of the rider). With such a configuration, even when the head of the rider or the like moves to the left or right, the sound from any of the left speakers 31L1 to 31L4 and the sound from any of the right speakers 31R1 to 31R4 can be easily delivered to the ears of the rider or the like.

It is to be noted that the left speakers 31L1 to 31L4 are "a first left speaker 31L1", "a second left speaker 31L2", "a third left speaker 31L3" and "a fourth left speaker L4" from the inside of the vehicle 1 toward the outside in the vehicle width direction. In addition, the right speakers 31R1 to 31R4 are "a first right speaker 31R1", "a second right speaker 31R2", "a third right speaker 31R3" and "a fourth right speaker 31R4" from the inside of the vehicle 1 toward the outside in the vehicle width direction. In a case where these speakers 31L1 to 31L4 and 31R1 to 31R4 do not have to be described in a distinguished manner in particular, the speakers will be referred to as "the speaker 31".

The vehicle 1 includes, as the operation unit 23, left and right operation units 41 and 42 respectively provided on the left and right sides of the steering handle 14, and an operation unit 43 disposed between the speaker array 22 and the seat 17 and at the center position in the vehicle width direction. On the operation units 41 to 43, provided are a switch group constituting a general operation system for operating a lighting device such as a blinker of the vehicle 1 and for turning on and off the power unit 11, and a switch group constituting an operation system related to the display unit 27 on the meter panel 21 and the speaker array 22.

The on-vehicle device 51 detects an operation for the switch group constituting the operation system related to the display unit 27 and the speaker array 22 from among the operation units 41 to 43, and performs various processes based on the operation that has been detected. It is to be noted that in a case where the on-vehicle device 51 has a function of controlling the lighting device of the vehicle 1 and controlling turning on and off the power unit 11, the on-vehicle device 51 may detect an operation for them to control the lighting device and to control turning on and off the power unit 11, based on the operation that has been detected.

Figure 4:
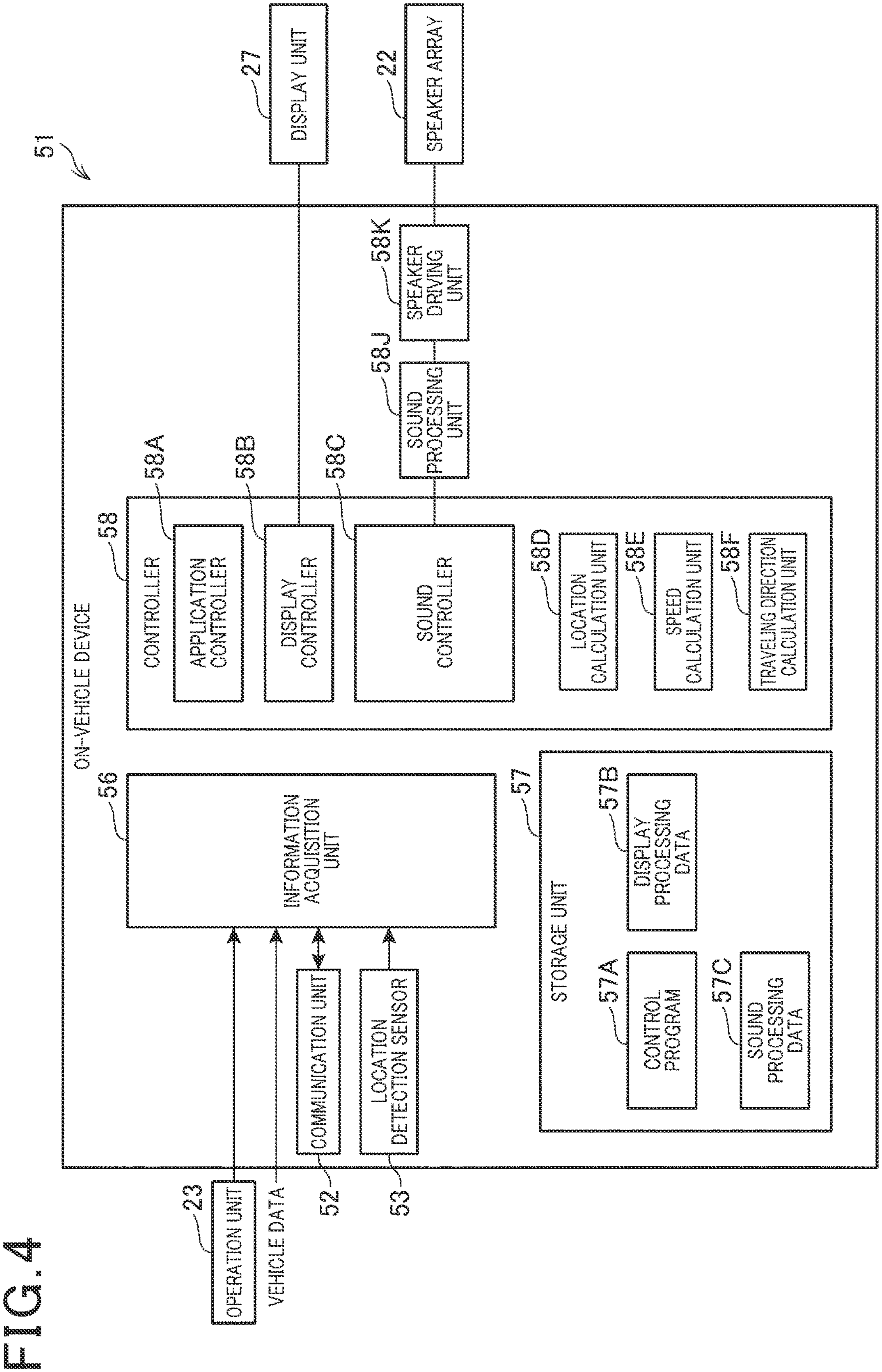
FIG. 4 is a block diagram showing a configuration of the on-vehicle device.

FIG. 4 is a block diagram showing a configuration of the on-vehicle device 51.

The on-vehicle device 51 includes a communication unit 52, a location detection sensor 53, an information acquisition unit 56, a storage unit 57, and a controller 58. The communication unit 52 includes an antenna and a communication module (transceiver/receiver) capable of communicating with a portable communication terminal carried by the rider or the like (for example, a smartphone, an intercom for a motorcycle attached to the rider, or the like). The location detection sensor 53 is a sensor capable of detecting a current location, and is, for example, a GPS unit.

The information acquisition unit 56 is an input interface for inputting various types of information, converts, into digital data that can be processed by the controller 58, the information that has been input, and outputs the digital data to the controller 58. The information acquisition unit 56 can be a hardware interface or a software interface that is processed by the processor in the controller 58. The information acquisition unit 56 acquires communication data of the communication unit 52, a detection result of the location detection sensor 53 or the like, and outputs, to the controller 58, the information that has been acquired. Further, the information acquisition unit 56 acquires an operation result of the operation unit 23 provided in the vehicle 1 and vehicle data that has been detected by various sensors provided in the vehicle 1, and outputs, to the controller 58, the information that has been acquired. The vehicle data includes information capable of identifying the vehicle speed and the acceleration of the vehicle 1, and includes, for example, a signal indicating the engine speed, the gear shift stage, or the vehicle speed. It is to be noted that the communication unit 52 and the location detection sensor 53 are not limited to the configuration incorporated into the on-vehicle device 51, but may be disposed outside the on-vehicle device 51. In addition, in a case where the vehicle 1 has a configuration corresponding to any of the communication unit 52 and the location detection sensor 53, the above information may be acquired from such a configuration, and any of the communication unit 52 and the location detection sensor 53 may be omitted from the on-vehicle device 51.

The storage unit 57 is composed of a semiconductor memory or magnetic recording device, and stores a program and data in a non-volatile manner. The storage unit 57 stores various types of data used by the controller 58. More specifically, the storage unit 57 stores a control program 57A, a display processing data 57B, a sound processing data 57C, and the like. The control program 57A includes programs for realizing various functions such as a menu screen display function on the display unit 27, a music playback function, a map display function, a telephone function, and the like. The display processing data 57B is data necessary for a display process on the display unit 27, and includes images such as menus displayed as options to be selected by the rider, and data indicating a hierarchical structure and the like of each menu.

The sound processing data 57C is data necessary for a sound process, and includes data for identifying a head transfer function indicating an impulse response from the position of a virtual sound source to a tympanic membrane of a listener (the rider or the like). The head transfer function includes information used in a known three-dimensional acoustic reproduction technique. By performing a known filter process, in which the head transfer function is subject to a convolution operation, on sound data to be output, an acoustic space where the sound arrives at the rider or the like from the position of a virtual sound source can be reproduced. In the present configuration, for example, by selectively using a plurality of types of head transfer functions that have been prepared beforehand, the acoustic space where the sounds arrive at the rider or the like on the front side of the vehicle 1 from different virtual sound sources on at least any of the left, right, front, and rear sides can be reproduced.

In addition, the sound processing data 57C includes information capable of identifying a title and a click sound of an operation button, such as a function selection button BG, which is displayed on the display unit 27. The title is, for example, text data of the title. The click sound is, for example, sound data corresponding to the click sound or predetermined data for designating the click sound from among the click sounds that are stored beforehand.

By controlling the respective units of the on-vehicle device 51, the controller 58 functions as a computer for controlling the display unit 27 and the speaker array 22 of the vehicle 1. More specifically, the controller 58 includes a processor, and by performing the control program 57A stored in the storage unit 57 by the processor, the controller 58 functions as an application controller 58A for conducting control related to applications, a display controller 58B for conducting control related to displays, and a sound controller 58C for conducting control related to sounds.

Further, by performing the control program 57A, the controller 58 also functions as a location calculation unit 58D, a speed calculation unit 58E, and a traveling direction calculation unit 58F. The location calculation unit 58D calculates the current location of the vehicle 1 on a map, based on a detection result of the location detection sensor 53. The speed calculation unit 58E calculates values of the vehicle speed, the acceleration, and the like, based on the vehicle data (for example, a signal indicating the engine speed, the gear shift stage, or the vehicle speed). The traveling direction calculation unit 58F calculates the traveling direction of the vehicle 1, based on data that has been acquired from at least any of a detection result of the location detection sensor 53 and a three-dimensional acceleration sensor 54.

The application controller 58A performs a menu screen display process, a music playback process, a map display process, a process for realizing a telephone, and the like, based on an instruction that has been input through the operation unit 23. Here, the menu screen display process is a process for displaying an operation screen so as to use various functions (a music playback function, a map display function, a telephone function, and the like) included in the on-vehicle device 51. The music playback process is a process for realizing the music playback function, and includes a process for receiving sound data such as a song from a smartphone communicably connected via the communication unit 52, and outputting the sound corresponding to the sound data. The map display process is a process for realizing the map display function, and includes a process for displaying map data including a current location using information that has been calculated by the location calculation unit 58D or the like, and a process for guiding a route from the current location to a preset destination by means of the display and the sound. The process for realizing the telephone is a process for realizing the telephone function, and is a known process for realizing a handsfree telephone call by using a smart phone communicably connected via the communication unit 52. It is to be noted that during the handsfree telephone call, rider's voices may be collected by using an intercom attached to the rider or a microphone installed beforehand in the vehicle 1. It is to be noted that known processes are widely applicable to the processes for realizing the above various functions (the music playback function, the map display function, the telephone function, and the like). In addition, the processes that the application controller 58A can perform are not limited to the above processes, and a known process may be appropriately applied.

The display controller 58B acquires display data to be displayed by the application controller 58A, and outputs the display data to the display unit 27 so as to display various images on the display unit 27. The sound controller 58C acquires sound data to be emitted by the application controller 58A, and outputs sounds corresponding to the sound data from the speaker array 22.

The on-vehicle device 51 includes a sound processing unit 58J (see FIG. 4) capable of performing, on the sound data, a filter process in which a head transfer function stored in the sound processing data 57C is subject to a convolution operation. A sound processing unit 58J includes a DSP (Digital Signal Processor), and can perform various sound processes related to the sounds such as the above filter process or volume adjustment. The sound data that has been output from the sound processing unit 58J is subject to a digital-analog conversion, and is output to a speaker driving unit 58K. The speaker driving unit 58K is an amplifier. The sound corresponding to the sound data is output from the speaker array 22 by the speaker driving unit 58K. Accordingly, the sound data to be emitted by the application controller 58A is converted into sound data that arrives from a virtual sound source set at a predetermined position, and the corresponding sound is output from the speaker array 22.

Figure 5:
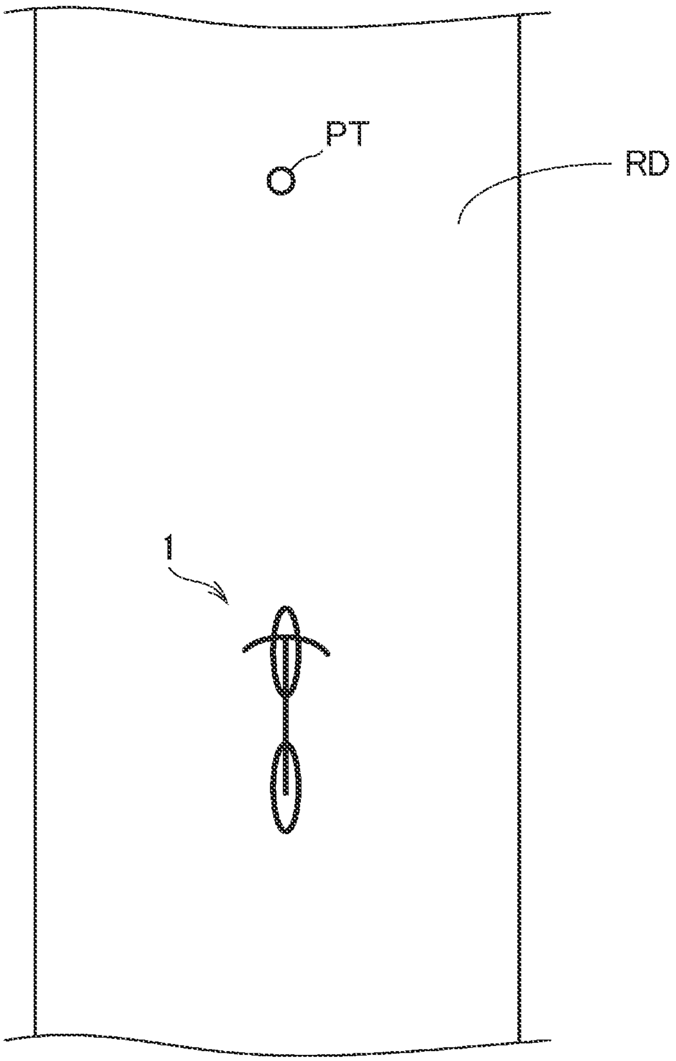
FIG. 5 is a diagram schematically showing a control example of a sound controller.

FIG. 5 is a diagram schematically showing a control example of the sound controller 58C.

In FIG. 5, a symbol PT denotes a position of the virtual sound source, and is referred to as a sound source position PT as appropriate. In FIG. 5, a symbol RD denotes a road surface on which the vehicle 1 travels.

The sound controller 58C sets the sound source position PT on the front side that is ahead of a traveling course of the vehicle 1, converts various sounds, into sounds that arrive from the sound source position PT that has been set, and outputs the corresponding sounds from the speaker array 22. In the vehicle 1, the sounds of a song at the time of the music playback process, the guidance sounds at the time of the map display process, and the sounds of the telephone partner are output from the speaker array 22 as the sounds that arrive from the sound source position PT. Therefore, the rider is able to recognize the sounds that arrive from the sound source position PT ahead of the traveling course while visually recognizing the traveling course. Thus, hearing easiness is improved, and effects in the driving support for guiding the driver's line of sight, while the rider is traveling, to a direction that should be visually recognized are easily obtainable.

Figure 6:
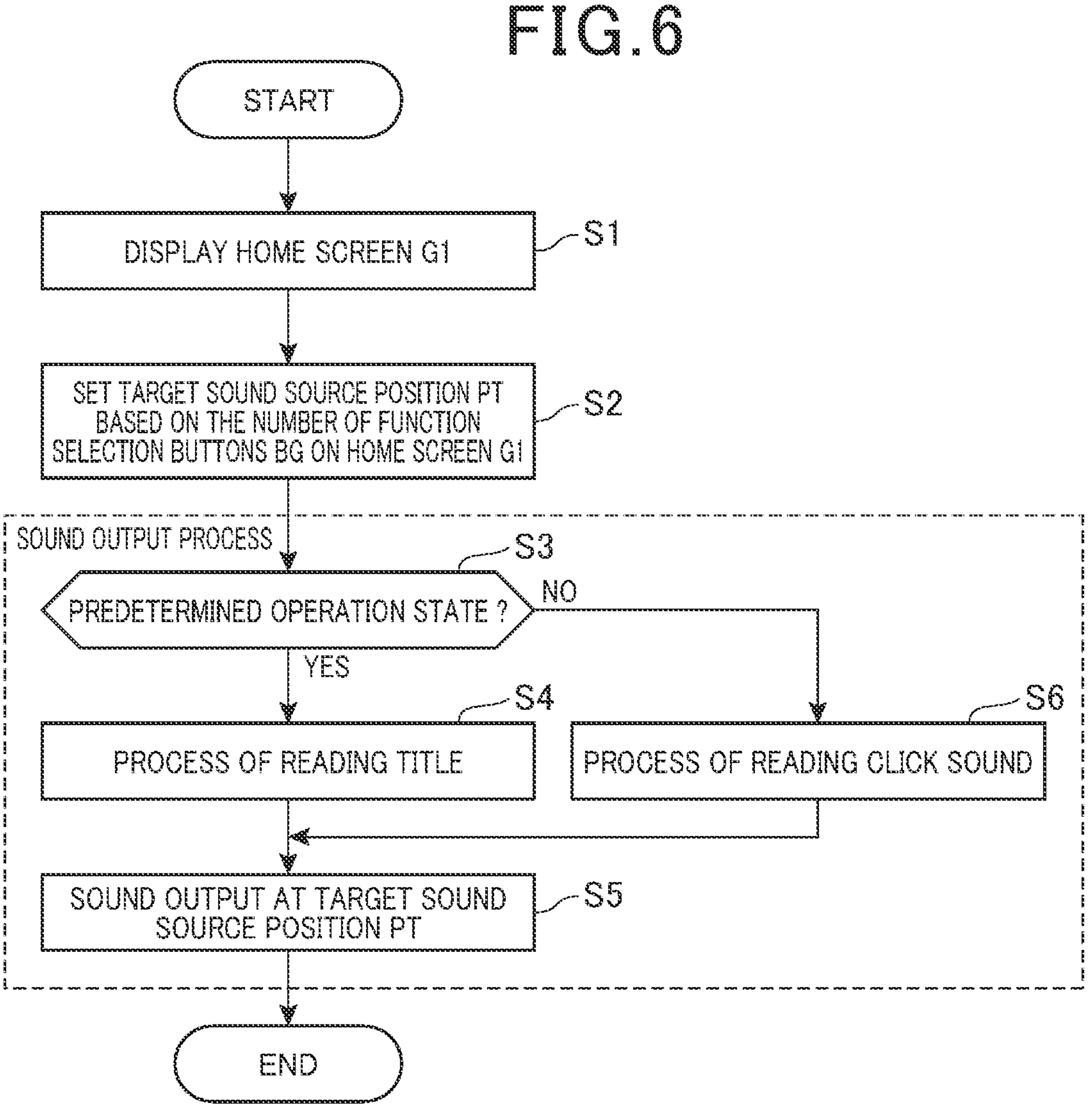
FIG. 6 is a flowchart showing a process related to a display and a sound of a home screen.

FIG. 6 is a flowchart showing a process related to the display and the sound of a home screen G1. In a case where an accessory power source of the vehicle 1 is turned on, or a predetermined instruction is input through the operation unit 23, the on-vehicle device 51 causes the display controller 58B to display the home screen G1 on the display unit 27 (step S1). The home screen G1 is a screen corresponding to the top screen among a plurality of menu screens that can be displayed on the display unit 27. As an example shown in FIG. 7, images BG, which are options for selecting various functions (the music playback function, the map display function, the telephone function, and the like) of the on-vehicle device 51, are displayed on the home screen G1. These images BG each also serve as an operation element, and will be hereinafter referred to as a "function selection button BG".

Figure 7:
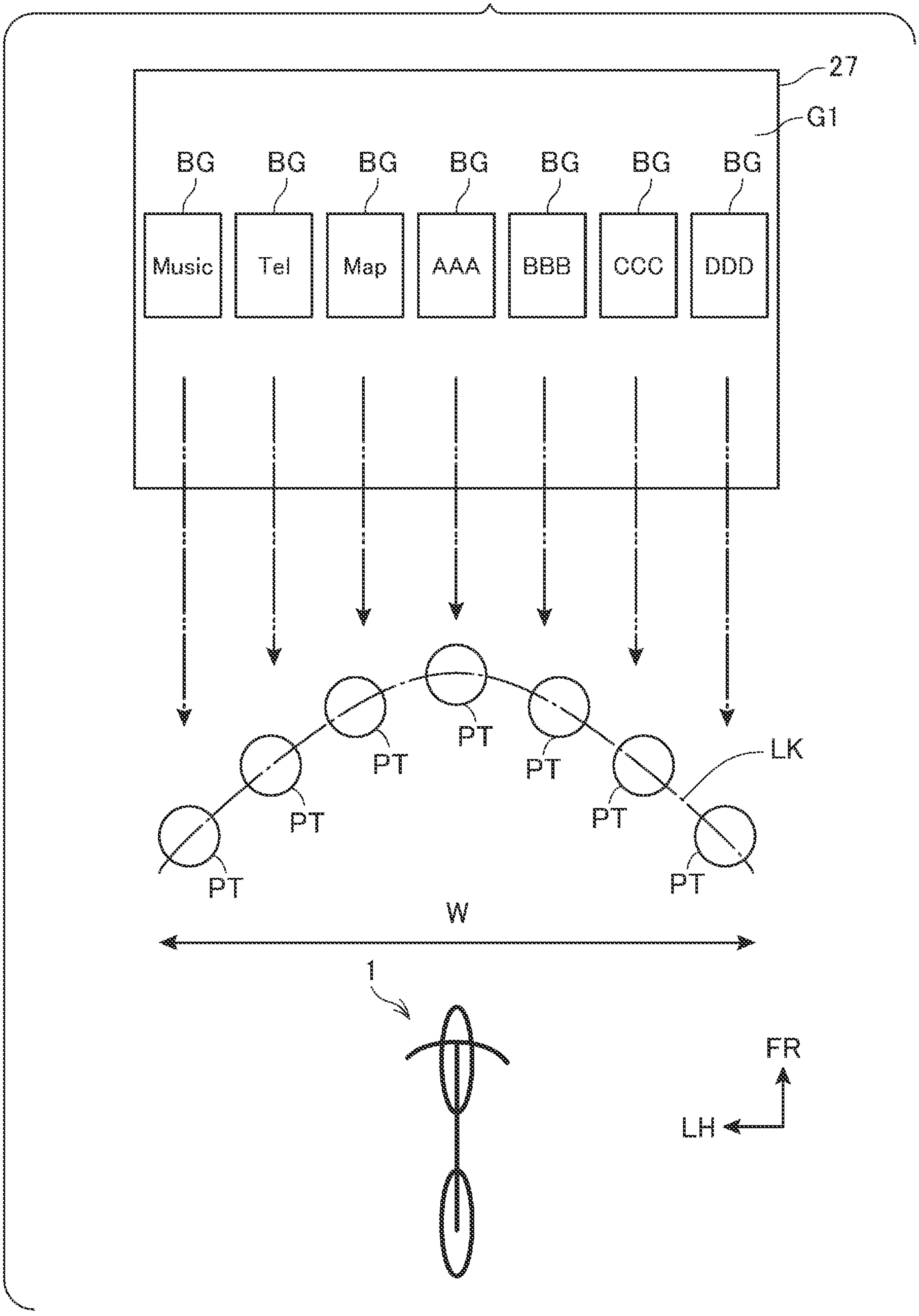
FIG. 7 is a diagram for describing the process related to the display and the sound of the home screen.

The function selection button BG is also an image (a so-called icon) indicating a selection content. In FIG. 7, a function selection button BG of "Music" is an operation element for instructing the selection of the music playback function, a function selection button BG of "Tel" is an operation element for instructing the selection of a telephone, and a function selection button BG of "Map" is an operation element for instructing the display of a map. In addition, the function selection buttons BG indicated by "AAA" to "DDD" are each an operation element for instructing the selection of another function. In FIG. 7, seven function selection buttons BG are arranged side by side in the vehicle width direction. Any of the function selection buttons BG is operated via the operation unit 23, so that a function that the rider or the like desires can be performed.

In the present configuration, as shown in FIG. 6, when the home screen G1 is displayed, the sound controller 58C performs a process for setting the target sound source position PT of the function selection button BG that has been displayed or selected, based on the number of the function selection buttons BG, which are the options displayed on the home screen G1 (step S2).

In step S2, as shown in FIG. 7, the target sound source positions PT respectively corresponding to the function selection buttons BG are set, based on the positions of the function selection buttons BG.

In this case, the arrangement direction of the respective target sound source positions PT (the vehicle width direction in FIG. 7) lies along the arrangement direction of the function selection buttons BG (corresponding to a first direction), and the arrangement order of the respective target sound source positions PT also matches the arrangement order of the function selection buttons BG. In FIG. 7, the target sound source positions PT corresponding to the respective function selection buttons BG are each indicated by an arrow of two-dot chain line.

Regarding the setting of the target sound source position PT, the sound controller 58C also performs the following process.

An arrangement interval between the respective target sound source positions PT in the arrangement direction (the vehicle width direction) is set, based on the number of the function selection buttons BG. More specifically, a left-right width W (see FIG. 7) for arranging the function selection buttons BG is set beforehand in consideration of left and right viewing angles or the like of an occupant such as a rider. The arrangement interval is set so that the target sound source positions PT can be arranged evenly within such a width W, based on the number of the function selection buttons BG on the displayed screen. Accordingly, the respective target sound source positions PT can be set within the left-right width W, which is set beforehand, so as to be easily seen.

Furthermore, as shown in FIG. 7, a virtual line LK is set to extend along the arrangement direction of the function selection buttons BG and to change in a front-rear direction of the vehicle 1, and the respective target sound source positions PT are arranged on the virtual line LK. Since the virtual line LK changes in the front-rear direction of the vehicle 1, it is easy to secure a separation distance between the front and rear sides of the respective target sound source positions PT.

In the present configuration, the virtual line LK is a line extending along the width direction of the vehicle 1 and projecting toward the front side of the vehicle 1. Therefore, it is easy to set the respective target sound source positions PT at positions suitably distant to the front side and left and right sides of the rider or the like with the rider or the like as a reference.

Referring back to FIG. 6, after the target sound source positions PT are set, the on-vehicle device 51 causes the sound controller 58C to perform a sound output process (steps S3 to S6). In this case, first, the sound controller 58C determines whether the operation state is in a predetermined operation state (step S3). In a case where it is not in the predetermined operation state (step S3: NO), the sound controller 58C reads, from the storage unit 57, the title of the function selection button BG that has been operated (step S4), and proceeds to a process of step S5.

Here, the predetermined operation state corresponds to an operation state in which the function selection button BG is repeatedly selected. Such an operation state is, for example, at least any of a case where the rider touches each function selection button BG displayed on the display unit 27 at a short-period interval that has been set beforehand by the rider, or a case where the rider operates and selects each function selection button BG at a short-period interval that has been set beforehand by the rider by using operation units 41 to 43 including a rotary or push type switch provided at a position other than the display unit 27.

In step S5, the sound controller 58C generates sound data of the title that has been read, converts the sound data into sound data that arrives from the target sound source position PT, and causes the speaker array 22 to output the corresponding sound. This sound is output when the function selection button BG is selected. Therefore, in a case where the rider performs only the operation of selecting any one of the function selection buttons BG, the sound indicating the title of the function selection button BG that has been selected is output as the sound that arrives from the target sound source position PT corresponding to the function selection button BG.

It is to be noted that in a case where the rider repeatedly selects the function selection button BG at a relatively long-period interval, the sound indicating the title of each function selection button BG that has been selected is output in a selected order by the sound that arrives from the target sound source position PT corresponding to the function selection button BG.

Figure 8:
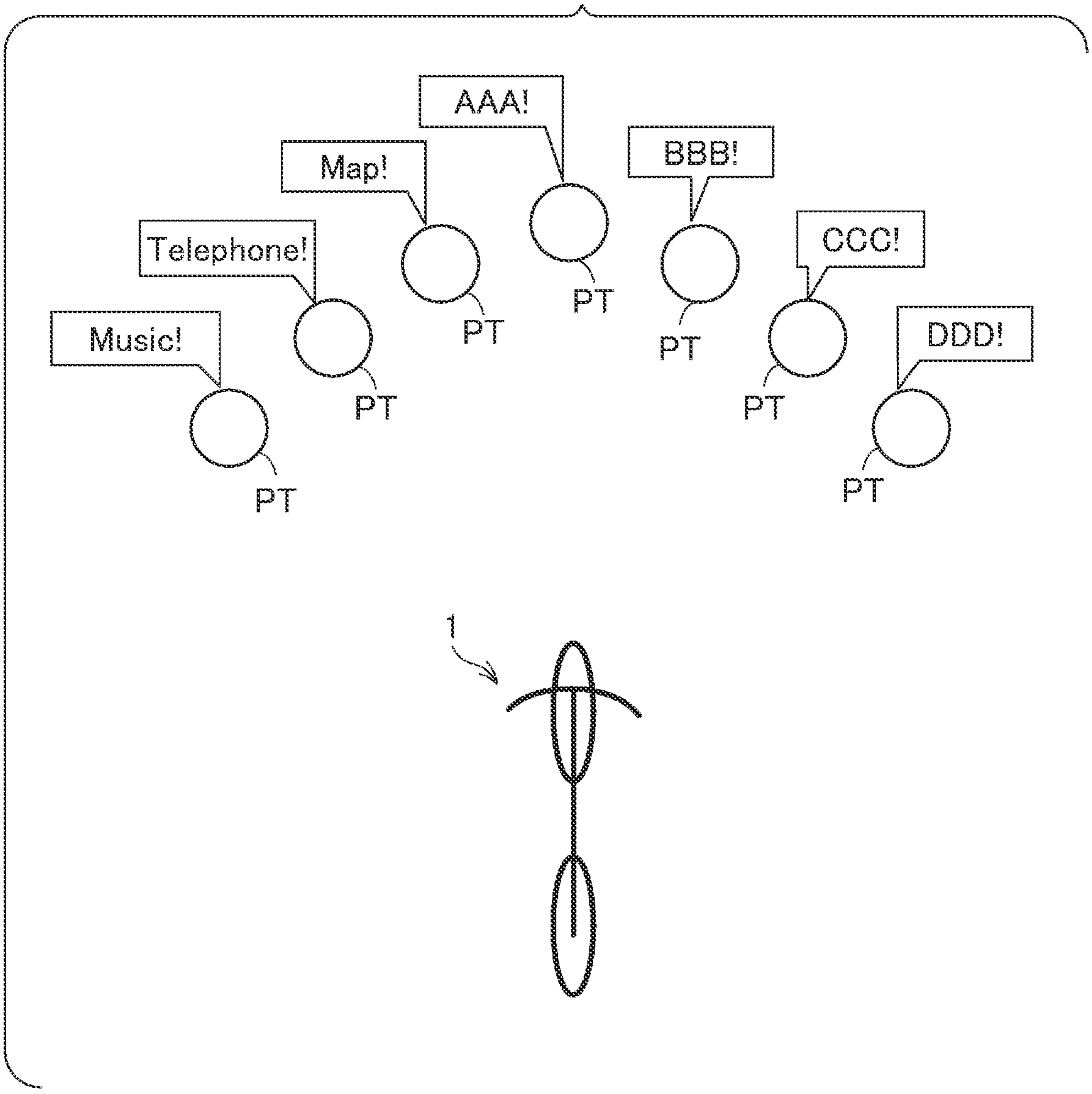
FIG. 8 is a diagram for describing a process related to the sound in a case where an operation state is not in a predetermined operation state.

As shown in FIG. 8, in a case where the function selection button BG of "Music" is selected, the sound corresponding to "Music" is output. In addition, this sound is output as a sound that arrives from a leftmost target sound source position PT corresponding to the position of the function selection button BG of "Music" on the screen. Accordingly, the rider easily recognizes that the function selection button BG of "Music" has been selected, without gazing at the screen.

In addition, in a case where another function selection button BG on the screen is selected, the sound corresponding to the title of such another function selection button BG is output, at a position corresponding to such another function selection button BG, as the sound that arrives from the target sound source position PT. The above configurations enable the rider to easily recognize which function selection button BG has been selected without gazing at the screen, even in a case where any of the function selection buttons BG on the screen is selected.

Referring back to FIG. 6, in the case of the predetermined operation state (step S3: YES), the sound controller 58C performs a click sound reading process (step S6), and then proceeds to a process of step S5. The click sound in this case is determined, based on contents stored in the storage unit 57 (information capable of identifying the click sound). It is to be noted that the click sound is generally a shorter notification sound than the title, and may be changed by an occupant such as a rider as appropriate.

Figure 9:
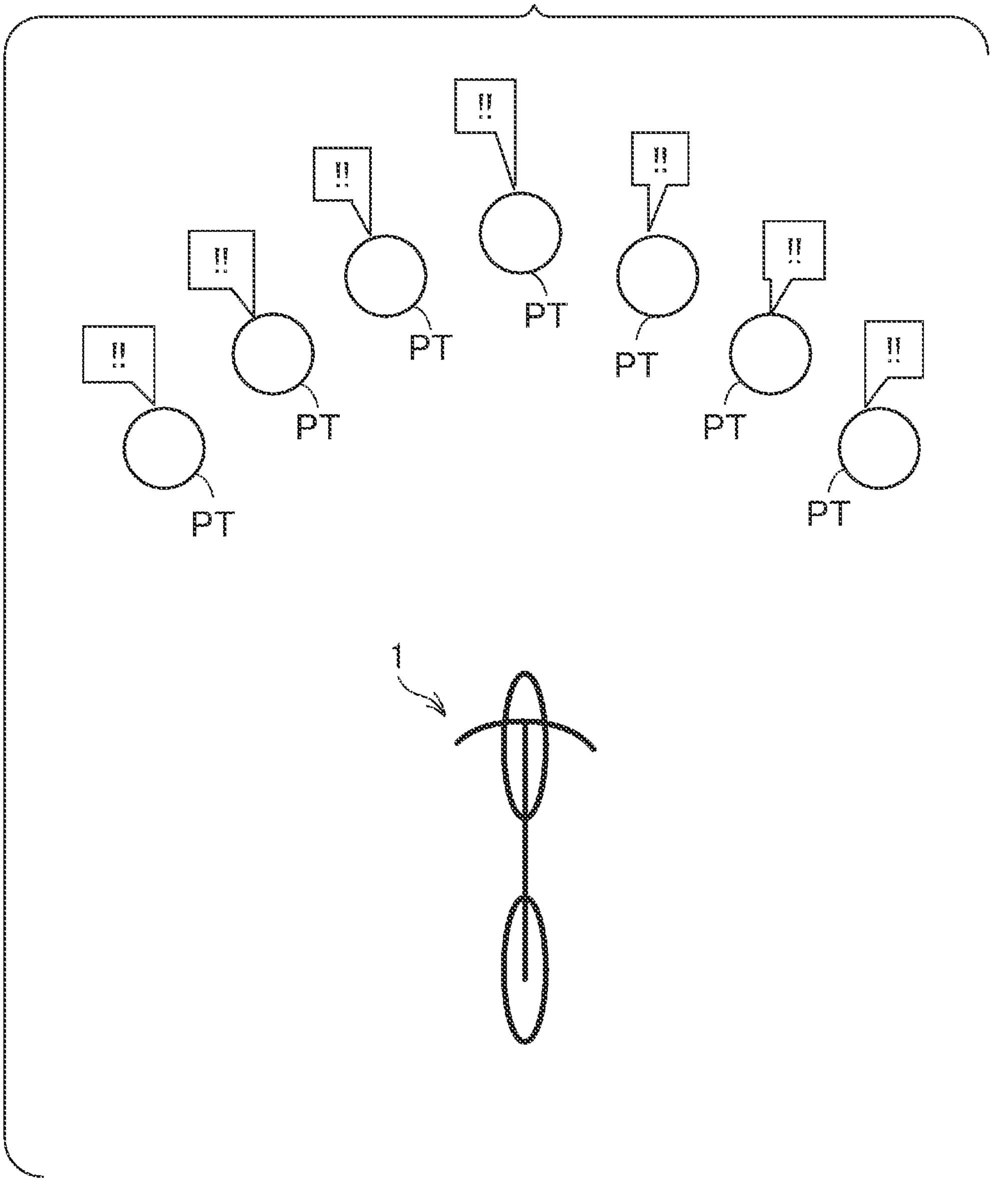
FIG. 9 is a diagram for describing a process related to the sound in a case where the operation state is in the predetermined operation state.

Therefore, in the case of the operation state in which the function selection button BG is repeatedly selected, as shown in FIG. 9, a short-period sound corresponding to the click sound (in FIG. 9, indicated by a symbol "!!") is repeatedly output as a sound that arrives from the target sound source position PT corresponding to the function selection button BG that has been selected. This configuration enables the rider to recognize the state in which the function selection button BG is repeatedly selected, and to easily recognize the position of the function selection button BG that is currently selected from at least any of the number of the click sounds or the position of the click sound.

Next, a process performed in a case where the function selection button BG is selected will be described.

Figure 10:
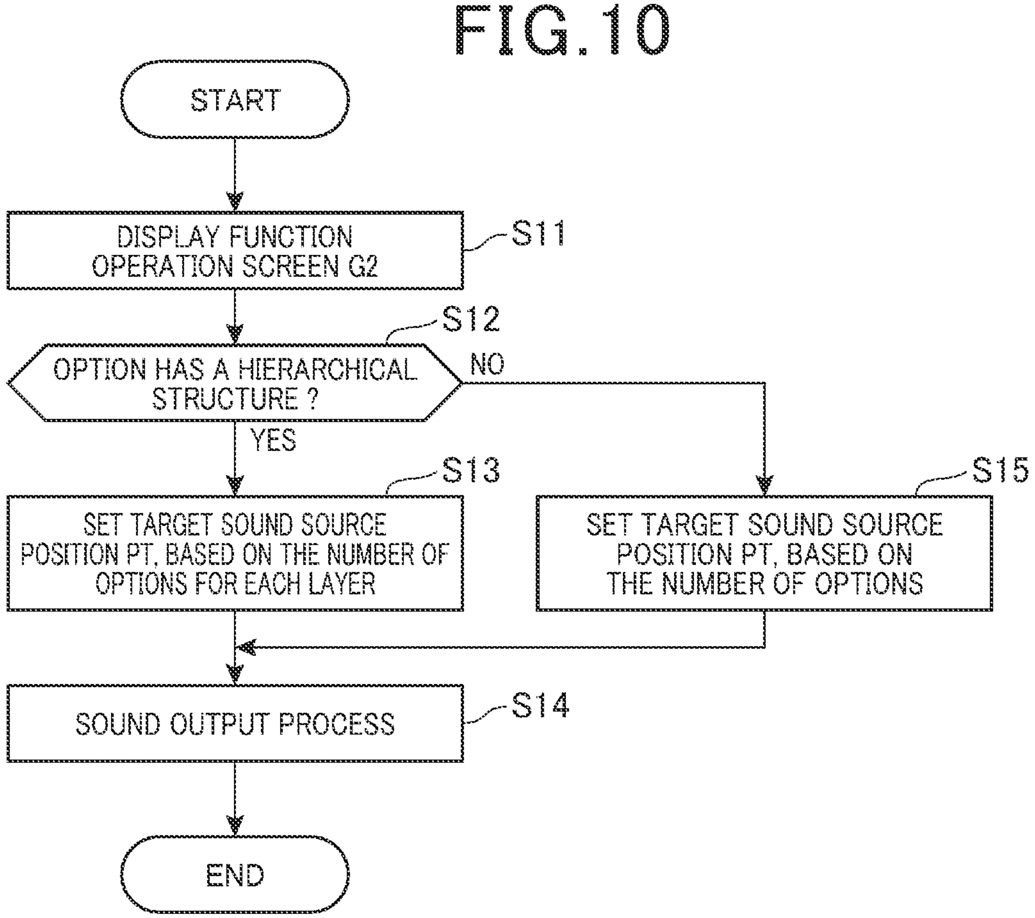
FIG. 10 is a flowchart showing a process related to the display and the sound in a case where a function selection button is selected.

FIG. 10 is a flowchart showing a process related to display and sound in a case where the function selection button BG is selected.

As shown in FIG. 10, in a case where the function selection button BG is selected, the on-vehicle device 51 causes the display controller 58B to display the function selection screen G1 corresponding to a menu screen for performing a function corresponding to the function selection button BG that has been selected. In this case, the sound controller 58C determines whether the option for realizing the above function has a hierarchical structure (step S12). In a case where the option has a hierarchical structure, the sound controller 58C proceeds to a process of step S13.

Figure 11:
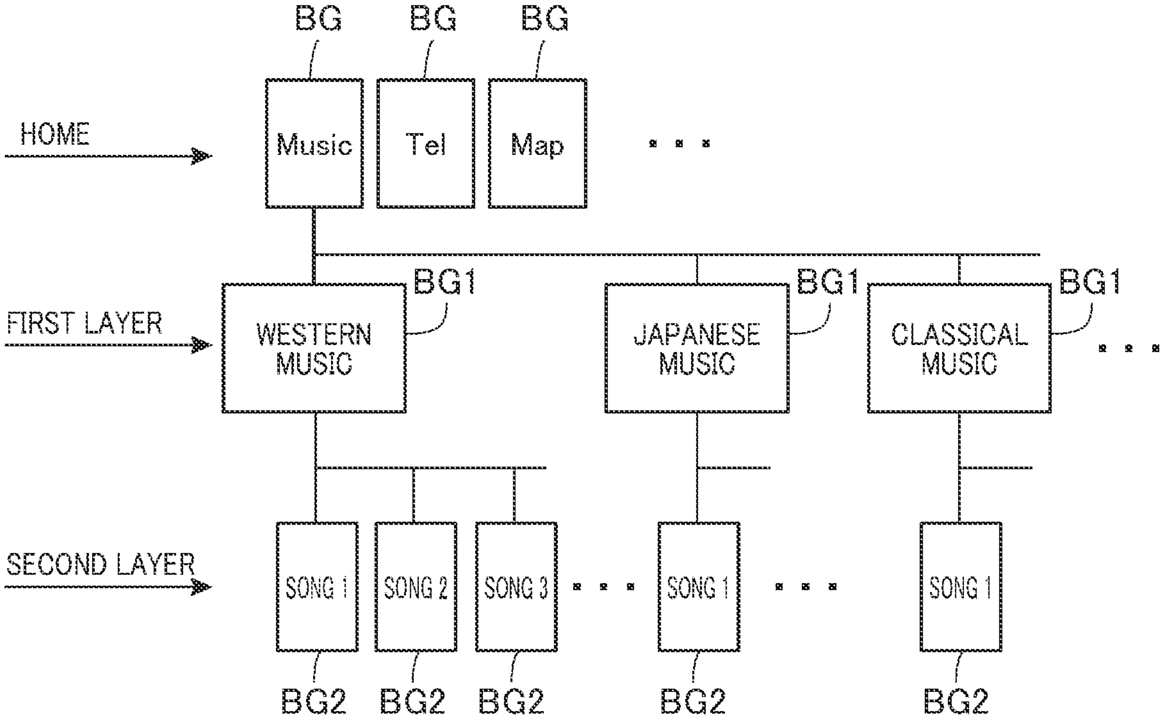
FIG. 11 is a diagram showing a hierarchical structure of options for realizing a music playback function.
Figure 12:
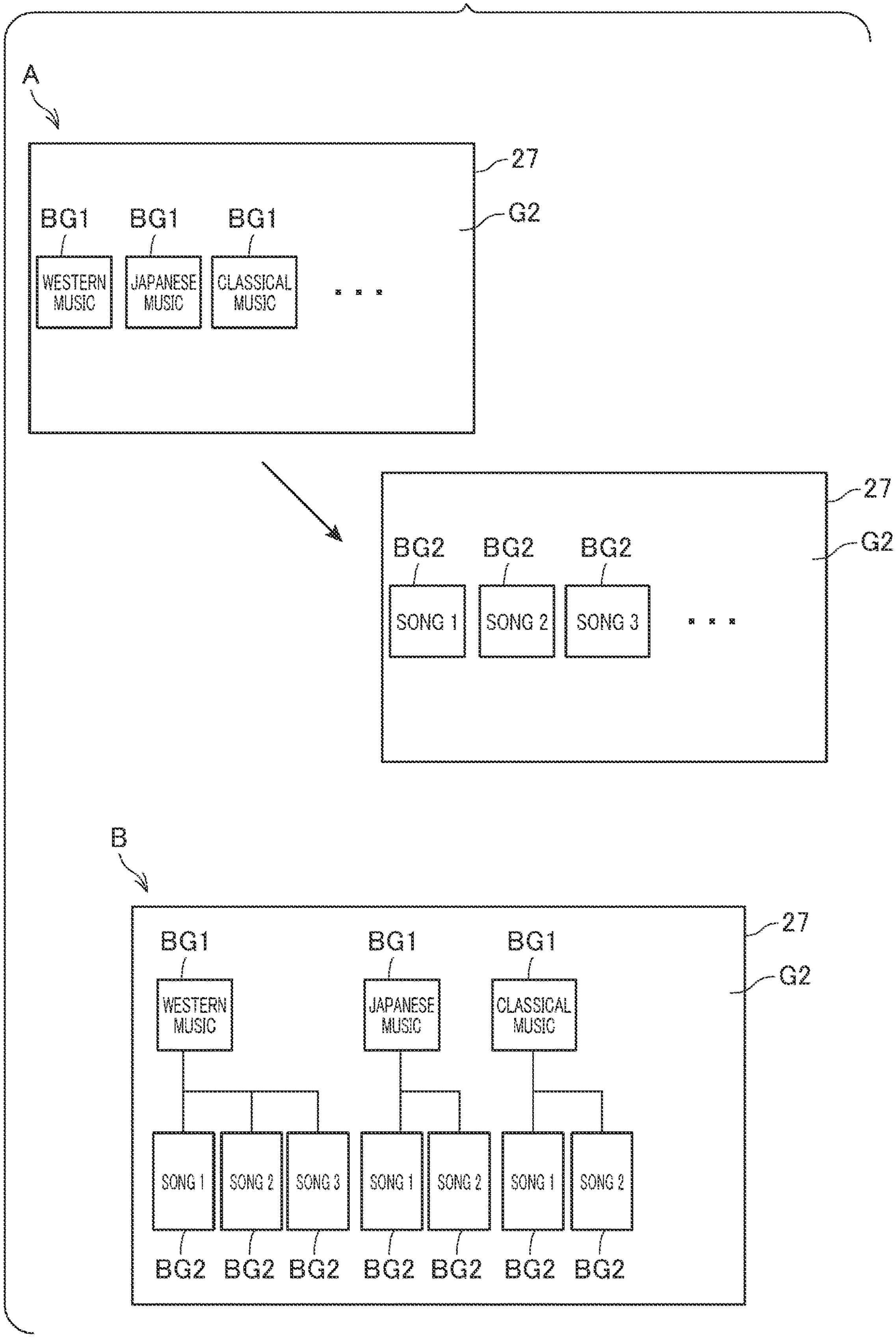
FIG. 12 is a diagram showing a display example of a function selection screen.

Hereinafter, in order to facilitate the understanding of the description, a description will be given, as an example, with regard to a case where the function selection button BG for realizing the music playback function has been operated. FIG. 11 shows a hierarchical structure of the option for realizing the music playback function. As shown in FIG. 11, the option for realizing the music playback function include a first layer including selection buttons BG1 each for selecting a genre of music such as "Western music", "Japanese music", and "Classical music", and a second layer including selection buttons BG2 each for selecting a song from each genre. The function selection screen G1 displays the respective selection buttons BG1 and BG2 according to the hierarchical structure. As a display method in this case, as shown by a symbol A in FIG. 12, the plurality of selection buttons BG1 each for selecting a genre of music are displayed first. When any of the selection buttons BG1 is selected, the plurality of selection buttons BG2 each for selecting a song of the genre are displayed. However, the display method is not limited to this display method. For example, as indicated by a character B in FIG. 12, the selection buttons BG1 and BG2 in a plurality of layers may be displayed simultaneously, in a case where the selection buttons can be displayed collectively.

Referring back to FIG. 10, in a case where the options have a hierarchical structure (step S12: YES), the sound controller 58C performs a process for setting the target sound source positions PT of the selection buttons BG1 and BG2 corresponding to the respective options, based on the number of the options in each layer (step S13).

In step S13, first, in a similar manner to the display example of step S2 in FIG. 6 and FIG. 7, the target sound source positions PT corresponding to the selection buttons BG1 are respectively set, based on the positions of the selection button BG1 in the first layer. Accordingly, as shown in FIG. 13 as an example, on the front side of the vehicle 1, the target sound source positions PT corresponding to the selection buttons BG1 in the first layer are respectively set at positions in an identical arrangement direction and an identical arrangement order to those of the selection buttons BG1 that are displayed.

Figure 13:
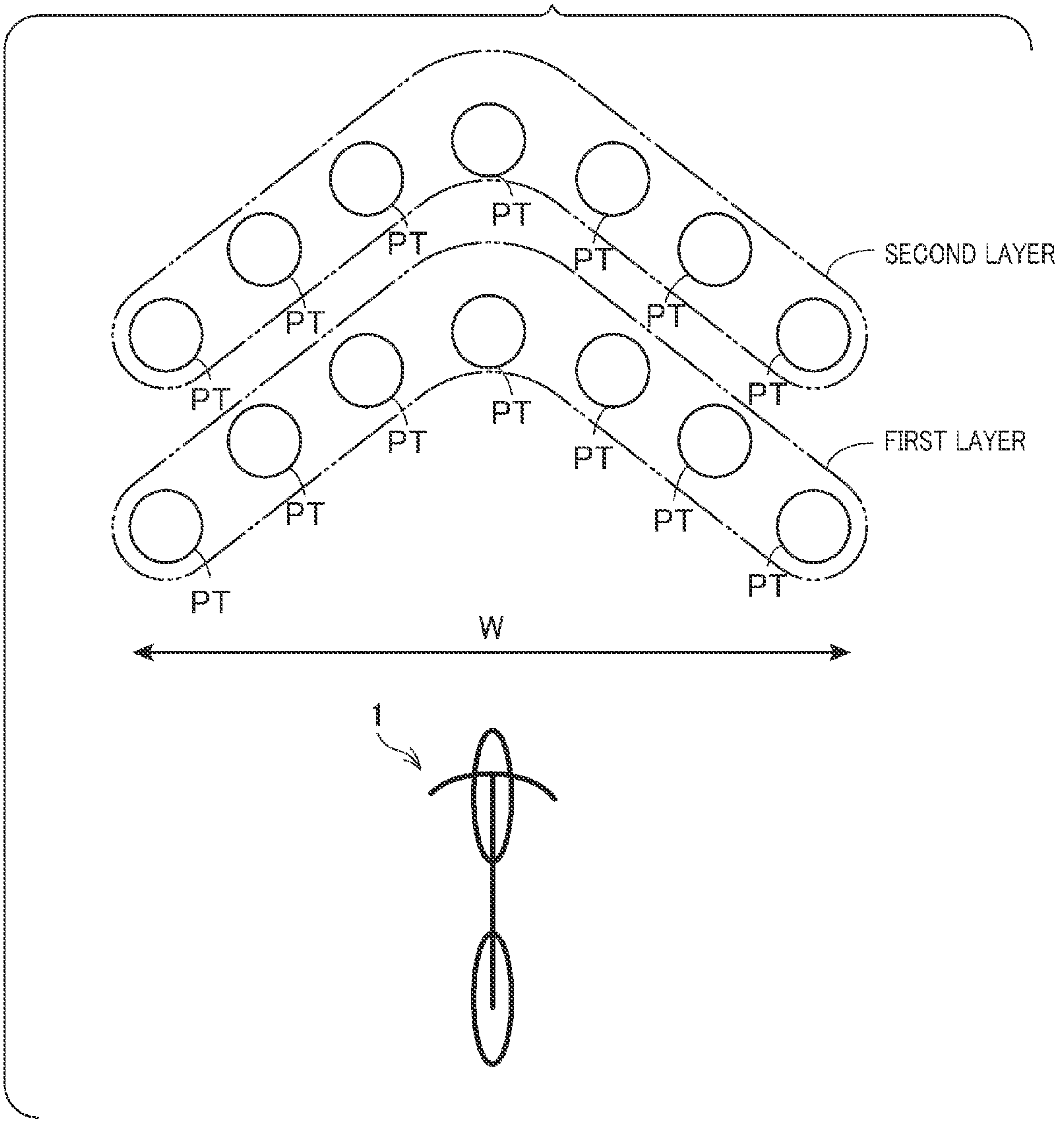
FIG. 13 is a diagram showing a target sound source position in a case where the options have a hierarchical structure.

Further, in step S13, as shown in FIG. 13, the positions of the target sound source positions PT corresponding to the selection buttons BG2 are respectively set in the identical arrangement direction and the identical arrangement order to those of the selection buttons BG2, based on the positions of the selection buttons BG2 in the second layer. The target sound source positions PT corresponding to the second layer are respectively set at positions that change in the front-rear direction of the vehicle 1 (a second direction), which is different from the arrangement direction of the selection buttons BG2 (the first direction), with respect to the target sound source positions PT corresponding to the first layer.

The above target sound source positions PT are arranged along the arrangement directions of the selection buttons BG1 and BG2, and are also arranged along the virtual line LK, which projects on the front side and which changes in the front-rear direction of the vehicle 1, and are also arranged at equal intervals within the left-right width W that has been set beforehand, in a similar manner to the display example of step S2 of FIG. 6 and FIG. 7.

After setting the target sound source position PT in this manner, the on-vehicle device 51 causes the sound controller 58C to perform a sound output process (step S14). The sound output process in this case is the same as the sound output process shown in FIG. 6 (step S3 to S6). Accordingly, in a case where the rider performs only the operation of selecting any one of the selection buttons BG1 or BG2, the sound indicating the title of the selection button BG1 or BG2 that has been selected is output as the sound that arrives from the target sound source position PT corresponding to the selection button BG1 or BG2.

On the other hand, in a case where the rider is in an operation state of repeatedly selecting the select button BG1 or BG2, a short-period sound corresponding to a click sound is repeatedly output as the sound that arrives from the target sound source position PT corresponding to the selection button BG1 or BG2 that has been selected, in a similar manner to FIG. 9. It is to be noted that in a case where the selection button BG2 for selecting a song is selected, a known sound playback process for outputting the sounds corresponding to the selected song from the speaker array 22 is performed.

On the other hand, in a case where the function selection button BG for realizing a function other than the music playback function and its option being not in the hierarchical structure (for example, the telephone function) is selected, the determination result in step S12 is negative (step S12: NO). In this case, the sound controller 58C proceeds to a process of step S15, and sets the target sound source positions PT respectively corresponding to the selection buttons that belong to the identical layer in the identical alignment direction and the identical alignment order to those of the selection buttons that are displayed, in a similar manner to step S2 of FIG. 6 and the display example of FIG. 7. Then, the on-vehicle device 51 proceeds to a process of step S14. Accordingly, the sound indicating the title of the selection button that has been selected or the sound corresponding to the click sound is output as the sound that arrives from the target sound source position PT that has been set, and the process corresponding to the selection button that has been selected is performed.

As described heretofore, the vehicle 1 includes a plurality of options including function selection buttons BG and selection buttons BG1 and BG2 respectively associated with operations of a plurality of functions mounted on the vehicle 1. The sound controller 58C is capable of changing a sound output from the speaker array 22 to a sound that arrives from the target virtual sound source PT that have been set at a predetermined position, and changes the position of the target virtual sound source PT for each of the plurality of options. This configuration facilitates intuitive recognition of the options without relying on the display, and easily improves the operation performance.

In addition, the vehicle 1 includes the display unit 27 for displaying the respective selection buttons BG, BG1, and BG2. The sound controller 58C changes the position of the target virtual sound source PT, based on the position of the option that has been selected. This configuration facilitates intuitive recognition of the options without gazing at the options that are displayed, and easily improves the operation performance.

It is to be noted that in the present configuration, the description has been given, as an example, with regard to a case where the function selection button BG and the selection buttons BG1 and BG2, which are the options, are selected, the position of the target virtual sound source PT is changed, based on the position of the button that has been selected. However, the present configuration is not limited to this. In addition, the description has been given with regard to a case where the respective selection buttons BG, BG1, and BG2 are icons displayed on the display unit 27 (also referred to as software switches). However, the present configuration is not limited this. All or any of the selection buttons BG, BG1, and BG2 may be hardware switches. In a case where all of the selection buttons BG, BG1, and BG2 are hardware switches, information related to the options may not necessarily be displayed on the display unit 27, or the display unit 27 may be omitted.

For example, whenever the home screen G1 shown in FIG. 7 as an example is displayed, the title sound (Music, Telephone, Map, . . . ) shown in FIG. 8 as an example may be output sequentially as a sound from the position of each target virtual sound source PT. In this case, the rider easily understands the position and the content of each function selection button BG with the sound, before the rider operates the function selection button BG.

Further, as shown in FIG. 11, the function selection button BG and the selection buttons BG1 and BG2 have a hierarchical structure. The sound controller 58C changes the position of the target virtual sound source PT in the first direction in which the respective selection buttons BG, BG1, and BG2 are arranged, based on the positions of the plurality of selection buttons BG, BG1, or BG2 in the identical layer. This configuration facilitates intuitive recognition of the respective selection buttons BG, BG1, or BG2 in the identical layer, and easily improves the operation performance.

Further, the sound controller 58C changes the position of the target virtual sound source PT to a different position on a predetermined virtual line LK, the predetermined virtual line LK being along the first direction in which the plurality of buttons BG, BG1, or BG2 are arranged and changing in a front-rear direction of the vehicle 1, based on the positions of the plurality of the options BG, BG1, or BG2 in the identical layer. Since the position of the target virtual sound source PT also changes in the front-rear direction of the vehicle 1, the difference in the position of the target virtual sound source PT can be more easily identified. Furthermore, the virtual line LK is a line being along a width direction of the vehicle 1 and projecting on a front side of the vehicle 1. Therefore, it is easy to set the target sound source position PT at a position which is appropriately distant from the rider or the like.

Further, the sound controller 58C changes the position of the target virtual sound source PT in a second direction (in this example, a front-rear direction of the vehicle 1) that is different from the first direction in which the respective selection buttons BG1 and BG2 are arranged, based on the positions of the plurality of buttons BG1 and BG2 in different layers. Therefore, the plurality of selection buttons BG1 and BG2 in different layers can be easily recognized intuitively.

Further, the sound controller 58C sets the position of the target virtual sound source PT corresponding to each of the plurality of options BG, BG1, and BG2, based on the number of the plurality of options BG, BG1, and BG2 in the identical layer. Therefore, an arrangement area and an arrangement interval of the selection buttons BG, BG1, and BG2 in the identical layer can be set appropriately. In the present configuration, the positions of the target virtual sound sources PT are set, based on the left-right width W that has been set beforehand and the number of the selection buttons BG, BG1, and BG2 in the identical layer. Therefore, the positions of the target virtual sound sources PT can be easily set within the left-right width W at appropriate intervals, and the recognition rate by the sound can be easily improved.

Further, the sound controller 58C outputs a sound indicating a title of one of the plurality of options BG, BG1, or BG2, as the sound that arrives from the target virtual sound source PT. Therefore, the content of the selection buttons BG, BG1, or BG2 can be easily recognized.

Moreover, the sound controller 58C outputs, as the sound that arrives from the target virtual sound source PT, the click sound corresponding a notification sound shorter than the sound indicating the title in a predetermined operation state in which the plurality of options BG, BG1, or BG2 are repeatedly selected, and outputs the sound indicating the title in a state other than the predetermined operation state. Accordingly, in a case where the selection of the selection buttons BG, BG1, or BG2 is repeatedly performed, the position of the selection button BG, BG1, or BG2 that is currently selected can be easily recognized from at least any of the number of the click sounds and the position of the click sound.

Furthermore, the vehicle 1 also has a function of performing a process for realizing an indicator indicating a change or a degree of a state of the vehicle 1, by using a technique of changing the position of the virtual sound source (indicator notification process). Hereinafter, a specific example of the indicator notification process will be described. (Indicator Notification Process)

Figure 14:
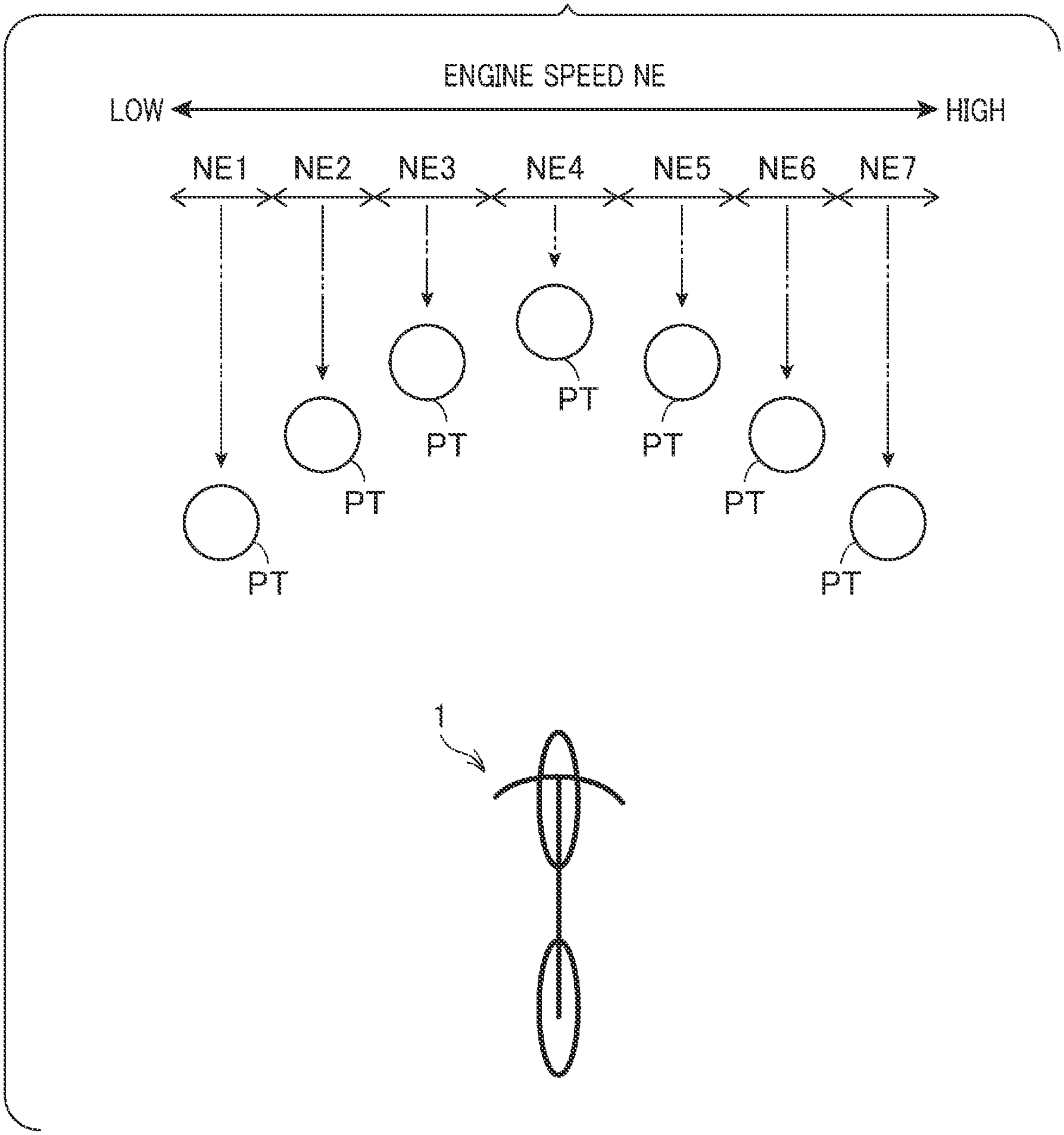
FIG. 14 is a diagram schematically showing an example of a shift-up indicator.

FIG. 14 is a diagram schematically showing an example of a shift-up indicator. It is to be noted that the shift-up indicator is a function of notifying a timing for shifting up. The shift-up indicator is capable of informing the rider of an appropriate timing for shifting up, and giving a warning to prevent an overspeed of the engine.

In the on-vehicle device 51, the sound controller 58C acquires an engine speed NE from among the vehicle data that has been acquired via the information acquisition unit 56, sets the position of the target virtual sound source PT according to the engine speed NE, and outputs, from the speaker array 22, a predetermined sound as a sound that arrives from the position of the target virtual sound source PT that has been set. As shown in FIG. 14 as an example, in a case of a first range NE1 in which the engine speed NE is relatively low, the position of the target virtual sound source PT is set to a leftmost position (one side in the vehicle width direction). As the engine speed NE increases from a second range NE2 to a seventh range NE7, the position of the target virtual sound source PT changes toward the right side (the other side in the vehicle width direction).

A fourth range NE4 positioned at the center between the first range NE1 and the seventh range NE7 includes a reference position for shifting up. The target virtual sound source PT corresponding to the fourth range NE4 is set on the front side and on a center position in a left-right direction of the vehicle 1. This configuration enables the rider to easily recognize the timing when the sound corresponding to the shift-up indicator arrives from the center in the left-right direction of the vehicle 1, that is, center in the left-right direction of the rider, as a reference position for shifting up. Further, the engine speed can be intuitively recognized from the position (the position of the target virtual sound source PT) from which the sound arrives. Therefore, the rider intuitively recognizes the engine speed and the shift-up timing easily, without gazing at the meter panel 21. It is to be noted that the sound corresponding to the shift-up indicator may be appropriately changed in accordance with the engine speed NE. For example, as the engine speed NE becomes higher, the tone may be higher. Accordingly, the position of the target virtual sound source PT and the sound change depending on the engine speed NE, and the rider more easily recognizes the engine speed NE and the shift-up timing.

Figure 15:
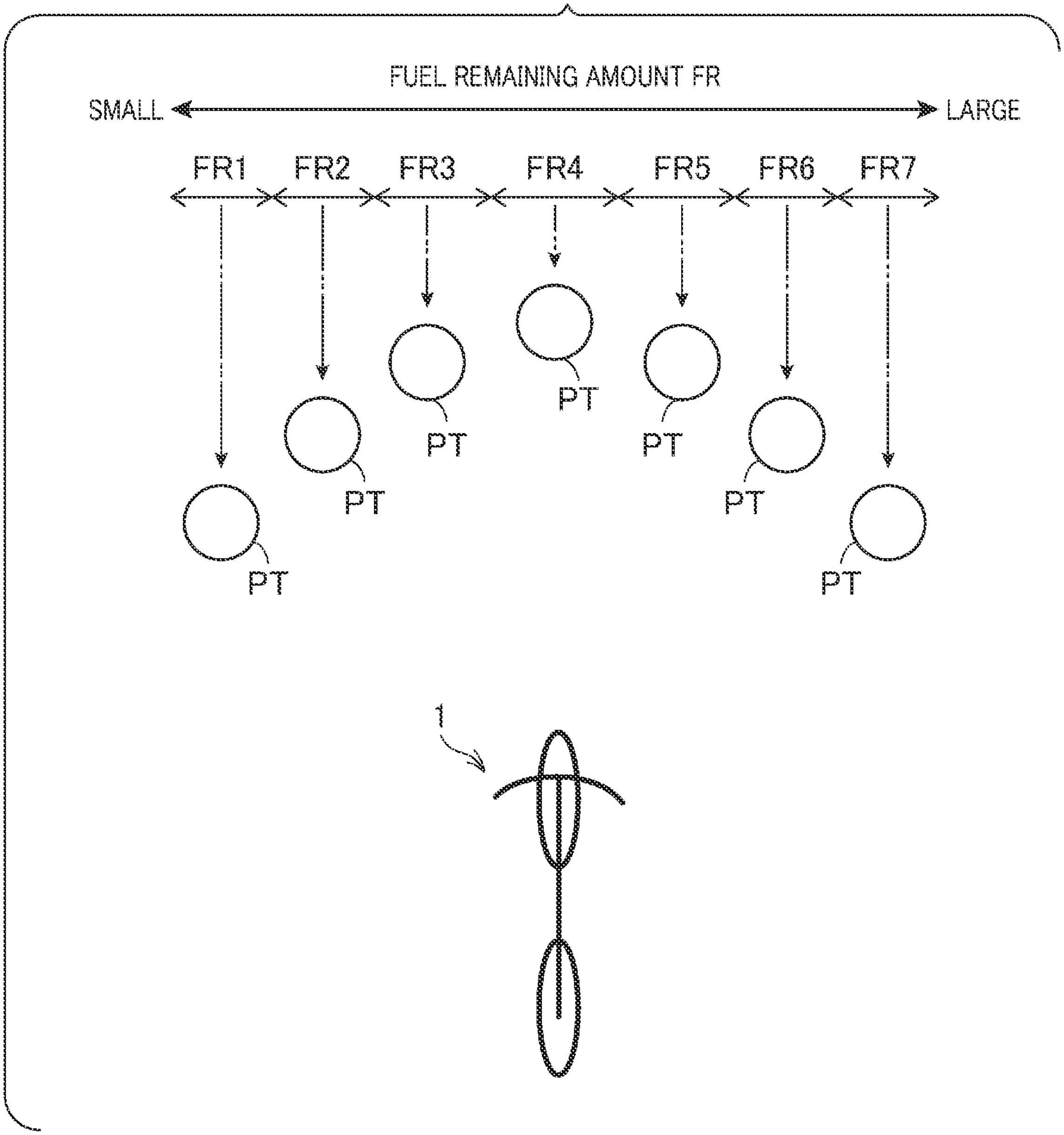
FIG. 15 is a diagram showing an implementation example of a fuel meter.

FIG. 15 is a diagram schematically showing an example of a fuel meter.

In the on-vehicle device 51, the sound controller 58C acquires data indicating a remaining fuel amount FR from among the vehicle data that has been acquired via the information acquisition unit 56, sets the position of the target virtual sound source PT according to the data, and outputs, from the speaker array 22, a predetermined sound as a sound that arrives from the position of the target virtual sound source PT that has been set. As shown in FIG. 15 as an example, in a case where the remaining fuel amount FR is in a first range FR1 in which the remaining fuel amount FR is the smallest, the position of the target virtual sound source PT is set to the leftmost position (one side in the vehicle width direction). As the remaining fuel amount FR increases from a second range FR2 to a seventh range FR7, the position of the target virtual sound source PT changes toward the right side (the other side in the vehicle width direction). Accordingly, the rider intuitively recognizes the remaining fuel amount FR easily, without gazing at the meter panel 21. It is to be noted that the tone of the sound corresponding to the remaining amount of the fuel meter may be changed depending on the remaining fuel amount FR or the position of the target virtual sound source PT. The tone of the sound also allows the rider to easily recognize the remaining fuel amount FR.

It is to be noted that for example, in a case where the remaining fuel amount FR is in a fifth range FR5, the position is not limited to that of the target virtual sound source PT corresponding to the fifth range FR5. The sound may be output from the position of the target virtual sound source PT continuously corresponding to the first range FR1 to the fifth range FR5 sequentially. The method for setting the position of the target virtual sound source PT and the method for outputting the sound may be appropriately changed.

Figure 16:
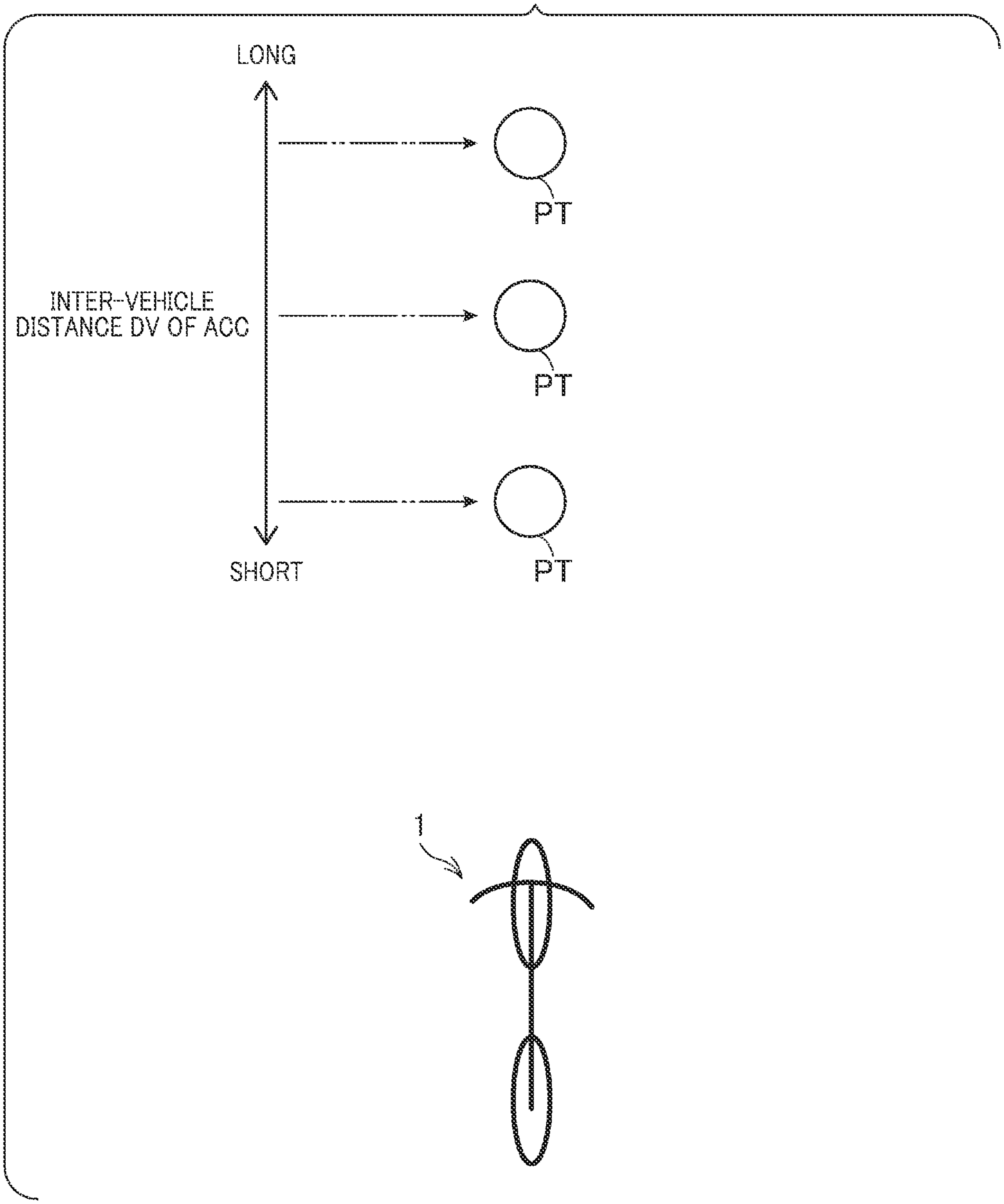
FIG. 16 is a diagram schematically showing an example of an inter-vehicle distance indicator.

FIG. 16 is a diagram schematically showing an example of an inter-vehicle distance indicator showing an inter-vehicle distance to be set by an Adaptive Cruise Control (ACC).

In the on-vehicle device 51, the sound controller 58C acquires data indicating an inter-vehicle distance DV set by ACC from among the vehicle data acquired via the information acquisition unit 56, sets the position of the target virtual sound source PT according to the inter-vehicle distance DV, and outputs, from the speaker array 22, a predetermined sound as a sound that arrives from the position of the target virtual sound source PT that has been set. As shown in FIG. 16 as an example, as the inter-vehicle distance DV is shorter, the position of the target virtual sound source PT changes to be closer to the front side of the vehicle 1. As the inter-vehicle distance DV is longer, the position of the target virtual sound source PT changes to be a farther position on the front side of the vehicle 1. Accordingly, the rider intuitively recognizes the inter-vehicle distance DV easily, without gazing at the meter panel 21 or the like. In this case, by matching the inter-vehicle distance DV with the position of the target virtual sound source PT, it becomes possible to allow the rider to recognize an actual measurement value of the inter-vehicle distance DV.

Further, the tone of the sound corresponding to the degree of the inter-vehicle distance DV may be changed depending on the inter-vehicle distance DV or the position of the target virtual sound source PT. The tone of the sound also allows the rider to easily recognize the inter-vehicle distance DV.

It is to be noted that the above embodiment merely show an embodiment of the present invention, and the present invention is not limited to the above embodiment. For example, the display unit 27 for displaying the selection buttons BG, BG1, BG2, and the like is not limited to the display device included in the on-vehicle device 51, but may be a display device of an external device such as a smartphone. Various known display devices are widely applicable. In addition, the description has been given with regard to a case where the present invention is applied to a motorcycle. However, the present invention is not limited to this, and is applicable to various vehicles such as a saddle riding type vehicle including motorcycles. In addition, the description has been given, as an example, with regard to a case where the on-vehicle device 51 is mounted beforehand on the vehicle 1. However, the on-vehicle device 51 may be configured to be retrofitted to various types of the vehicle 1.

In addition, each configuration of the on-vehicle device 51 can be optionally realized by cooperation and the like of hardware and software, and can be appropriately changed. In addition, the process corresponding to each step of each flowchart may be divided or merged. In addition, the control program 57A is widely applicable to a program that is downloaded from a distribution server or the like on a communication network via a telecommunication line and that can be performed by a computer provided in any on-vehicle device or any smart phone, or a program that is stored in a recording medium, such as a magnetic recording medium, an optical recording medium, a semiconductor recording medium, or the like and that is read from the recording medium to be performed by the computer.

REFERENCE SINGS LIST

1 vehicle
22 speaker array (speaker unit)
23 operation unit
25, 26 instrument
27 display unit
51 on-vehicle device
52 communication unit
53 position detection sensor
56 information acquisition unit
57 storage unit
58 controller
58A application controller
58B display controller
58C sound controller
58D position calculation unit
58E speed calculation unit
58F traveling direction calculation unit
58J sound processing unit
58K speaker driving unit
PT sound source position (target sound source position)
RD road surface
BG function selection button (option)
BG1, BG2 selection button (option)
G1 home screen
G2 function selection screen

What is claimed is:

1. A vehicle comprising:

a plurality of speakers;

a processor including a sound controller configured to control a sound output from each of the plurality of speakers;

a plurality of options respectively associated with operations of a plurality of functions installed in the vehicle;

wherein the sound controller is capable of changing the sound output from each of the plurality of speakers to a sound that arrives from a virtual sound source set at a predetermined position, and changes a position of the virtual sound source for each of the plurality of options, the sound controller has a function of changing a sound corresponding to an indicator indicating a state to the sound that arrives from the virtual sound source set at a position corresponding to a degree of the state, and performing an indicator notification process for outputting the sound from one of the plurality of speakers, the indicator indicating the state includes an inter-vehicle distance indicator configured to indicate an inter-vehicle distance set by adaptive cruise control, and wherein the sound controller changes the position of the virtual sound source in a front-rear direction of the vehicle, based on the inter-vehicle distance.

2. The vehicle according to claim 1, wherein the plurality of options have a hierarchical structure, and wherein the sound controller changes the position of the virtual sound source in a first direction in which the plurality of options are arranged, based on the positions of the plurality of options in an identical layer.

3. The vehicle according to claim 2, wherein the sound controller changes the position of the virtual sound source to a different position on a predetermined virtual line, the predetermined virtual line being along the first direction in which the plurality of options are arranged and changing in a front-rear direction of the vehicle, based on the positions of the plurality of the options in the identical layer.

4. The vehicle according to claim 3, wherein the virtual line is a line being along a width direction of the vehicle and projecting on a front side of the vehicle.

5. The vehicle according to claim 2, wherein the sound controller changes the position of the virtual sound source in a second direction that is different from the first direction, based on the positions of the plurality of options in a different layer.

6. The vehicle according to claim 2, wherein the sound controller sets the position of the virtual sound source corresponding to each of the plurality of options, based on the number of the plurality of options in the identical layer.

7. The vehicle according to claim 1, wherein the sound controller outputs a sound indicating a title of one of the plurality of options, as the sound that arrives from the virtual sound source.

8. The vehicle according to claim 7, wherein the sound controller outputs, as the sound that arrives from the virtual sound source, a predetermined notification sound shorter than the sound indicating the title in a predetermined operation state in which the plurality of options are repeatedly selected, and outputs the sound indicating the title in a state other than the predetermined operation state.

9. The vehicle according to claim 1, wherein the sound controller changes a tone of the sound corresponding to the indicator indicating the state, depending on the degree of the state.

10. The vehicle according to claim 1, further comprising a display configured to display the plurality of options, wherein the sound controller changes the position of the virtual sound source, based on a position of an option that has been displayed or selected.

11. A vehicle comprising:

a plurality of speakers;

a processor including a sound controller configured to control a sound output from each of the plurality of speakers; and a plurality of options respectively associated with operations of a plurality of functions installed in the vehicle, wherein the sound controller is capable of changing the sound output from each of the plurality of speakers to a sound that arrives from a virtual sound source set at a predetermined position, and changes a position of the virtual sound source for each of the plurality of options;

wherein the plurality of options have a hierarchical structure, and wherein the sound controller changes the position of the virtual sound source in a first direction in which the plurality of options are arranged, based on the positions of the plurality of options in an identical layer.

12. The vehicle according to claim 11, wherein the sound controller changes the position of the virtual sound source to a different position on a predetermined virtual line, the predetermined virtual line being along the first direction in which the plurality of options are arranged and changing in a front-rear direction of the vehicle, based on the positions of the plurality of the options in the identical layer.

13. The vehicle according to claim 12, wherein the virtual line is a line being along a width direction of the vehicle and projecting on a front side of the vehicle.

14. The vehicle according to claim 11, wherein the sound controller changes the position of the virtual sound source in a second direction that is different from the first direction, based on the positions of the plurality of options in a different layer.

15. The vehicle according to claim 11, wherein the sound controller sets the position of the virtual sound source corresponding to each of the plurality of options, based on the number of the plurality of options in the identical layer.

16. A vehicle comprising:

a plurality of speakers;

a processor including a sound controller configured to control a sound output from each of the plurality of speakers; and a plurality of options respectively associated with operations of a plurality of functions installed in the vehicle, wherein the sound controller is capable of changing the sound output from each of the plurality of speakers to a sound that arrives from a virtual sound source set at a predetermined position, and changes a position of the virtual sound source for each of the plurality of options;

wherein the sound controller outputs a sound indicating a title of one of the plurality of options, as the sound that arrives from the virtual sound source;

wherein the sound controller outputs, as the sound that arrives from the virtual sound source, a predetermined notification sound shorter than the sound indicating the title in a predetermined operation state in which the plurality of options are repeatedly selected, and outputs the sound indicating the title in a state other than the predetermined operation state.

* * * * *